(12) United States Patent
Grossman

(10) Patent No.: US 12,030,507 B2
(45) Date of Patent: Jul. 9, 2024

(54) METHOD AND SYSTEM FOR PREDICTING A TRAJECTORY OF A TARGET VEHICLE IN AN ENVIRONMENT OF A VEHICLE

(71) Applicant: Dr. Ing. h.c. F. Porsche Aktiengesellschaft, Stuttgart (DE)

(72) Inventor: Martin Grossman, Prague (CZ)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 187 days.

(21) Appl. No.: 17/359,769

(22) Filed: Jun. 28, 2021

(65) Prior Publication Data
US 2021/0403008 A1 Dec. 30, 2021

(30) Foreign Application Priority Data
Jun. 29, 2020 (DE) ...................... 10 2020 117 004.1

(51) Int. Cl.
*B60W 40/04* (2006.01)
*B60W 50/00* (2006.01)
(Continued)

(52) U.S. Cl.
CPC ........ *B60W 50/0097* (2013.01); *B60W 40/04* (2013.01); *G06T 7/246* (2017.01);
(Continued)

(58) Field of Classification Search
CPC ............. B60W 50/0097; B60W 40/04; B60W 2552/53; B60W 2552/30; B60W 30/0956;
(Continued)

(56) References Cited

U.S. PATENT DOCUMENTS 10,515,278 B2    12/2019  Ide
11,247,692 B2 *   2/2022  Ohara .................... G06V 20/58
(Continued)

FOREIGN PATENT DOCUMENTS

CN    102509067     *  6/2012
CN    109583151 A      4/2019
(Continued)

OTHER PUBLICATIONS

Tejus Gupta, "Robust Lane Detection Using Multiple Features", Sep. 26, 2011 (Year: 2011).*
(Continued)

*Primary Examiner* — Elaine Gort
*Assistant Examiner* — Matthias S Weisfeld
(74) *Attorney, Agent, or Firm* — Buchanan Ingersoll & Rooney PC

(57) ABSTRACT

A method for predicting a trajectory of a target vehicle in an environment of a vehicle. The method includes the steps of a) capturing states of the target vehicle, capturing states of further vehicle objects in the environment of the vehicle and capturing road markings by a camera-based capture device; b) preprocessing the data obtained in step a), wherein outliers are removed and missing states are calculated; c) calculating an estimated trajectory by a physical model on the basis of the data preprocessed in step b); d) calculating a driver-behavior-based trajectory on the basis of the data preprocessed in step b); and e) combining the trajectories calculated in steps c) and d) to form a predicted trajectory of the target vehicle.

18 Claims, 2 Drawing Sheets

Figure 1:
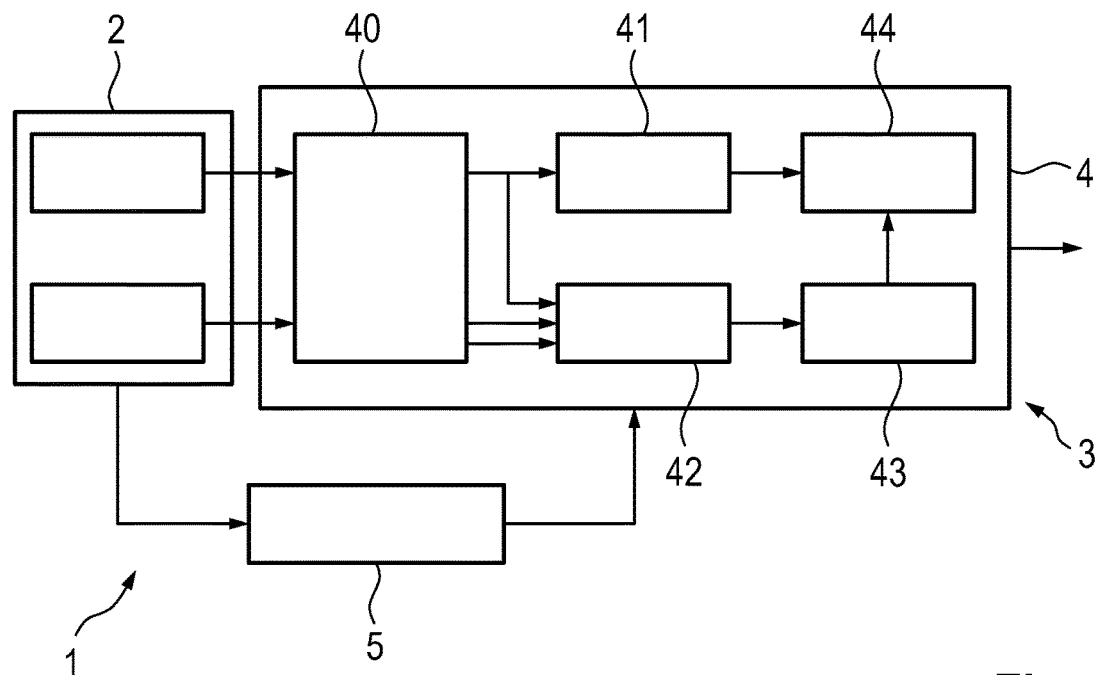

(51) Int. Cl.
   *G06T 7/246*       (2017.01)
   *G06V 20/56*       (2022.01)
   *B60W 30/095*      (2012.01)
(52) U.S. Cl.
   CPC ....... *G06V 20/588* (2022.01); *B60W 30/0956* (2013.01); *B60W 2050/0052* (2013.01); *B60W 2420/403* (2013.01); *B60W 2552/30* (2020.02); *B60W 2552/53* (2020.02); *G06T 2207/30241* (2013.01); *G06T 2207/30256* (2013.01)
(58) Field of Classification Search
   CPC ...... B60W 2050/0052; B60W 2420/42; G06T 7/246; G06T 2207/30241; G06T 2207/30256; G06V 20/588
   USPC ......................................................... 701/117
   See application file for complete search history.

(56) References Cited

U.S. PATENT DOCUMENTS

| | | | |
|---|---|---|---|
| 2004/0111200 A1* | 6/2004 | Rao | B60R 21/013 701/45 |
| 2008/0091352 A1* | 4/2008 | O'Hare | G08G 1/163 340/436 |
| 2014/0018985 A1 | 1/2014 | Gupta et al. | |
| 2015/0183431 A1* | 7/2015 | Nanami | B60W 30/095 701/301 |
| 2016/0101779 A1* | 4/2016 | Katoh | G08G 1/166 340/435 |
| 2016/0288798 A1 | 10/2016 | Michalke et al. | |
| 2016/0325743 A1* | 11/2016 | Schmüdderich | B60W 30/14 |
| 2017/0016734 A1* | 1/2017 | Gupta | B60W 30/00 |
| 2017/0102707 A1 | 4/2017 | Reichel et al. | |
| 2018/0143644 A1* | 5/2018 | Li | G06V 40/107 |
| 2018/0356517 A1* | 12/2018 | Cieslar | G01S 13/42 |
| 2019/0302767 A1* | 10/2019 | Sapp | G08G 1/166 |
| 2019/0322285 A1 | 10/2019 | Lagre | |
| 2019/0323852 A1* | 10/2019 | Ondruska | G06V 20/56 |
| 2020/0265710 A1 | 8/2020 | Zhan et al. | |
| 2020/0371228 A1* | 11/2020 | Wang | G06V 20/56 |

FOREIGN PATENT DOCUMENTS

| | | |
|---|---|---|
| CN | 110705388 A | 1/2020 |
| CN | 110758382 A | 2/2020 |
| DE | 102011018948 A1 | 1/2012 |
| DE | 102012009555 A1 | 11/2012 |
| DE | 102013224026 A1 | 5/2015 |
| DE | 102013021840 A1 | 6/2015 |
| DE | 102016119502 A1 | 4/2018 |
| EP | 3467799 A1 | 4/2019 |
| JP | 09506698 A | 6/1997 |
| JP | 11099849 A | 4/1999 |
| JP | 2004322916 A | 11/2004 |
| JP | 2006209333 A | 8/2006 |
| JP | 2014019433 A | 2/2014 |
| JP | 2014067169 A | 4/2014 |
| JP | 2016212872 A | 12/2016 |
| JP | 2018039285 A | 3/2018 |
| JP | 2018083610 A | 5/2018 |
| JP | 2018103863 A | 7/2018 |
| JP | 2019106049 A | 6/2019 |
| JP | 2019128614 A | 8/2019 |
| WO | 2014024284 A1 | 2/2014 |
| WO | 2015185175 A1 | 12/2015 |

OTHER PUBLICATIONS

Tejus Gupta "Robust Lane Detection Model Using Multiple Features", Sep. 26, 2011 (Year: 2011).*

E. J. Manley, "A heuristic model of bounded route choice in urban areas", Apr. 19, 2015, Transportation Research, Elsevier (Year: 2015).*

Korean Notice of Preliminary Rejection for Korean Application No. 10-2021-0084560, dated Jun. 29, 2022 with translation, 9 pages.

Japanese Notice of Reasons for Refusal for Japanese Application No. 2021-107495, dated Aug. 3, 2022 with translation, 7 pages.

Chinese Office Action with Search Report for Chinese Application No. 202110726829.X, dated Nov. 2, 2023 with translation, 15 pages.

* cited by examiner

METHOD AND SYSTEM FOR PREDICTING A TRAJECTORY OF A TARGET VEHICLE IN AN ENVIRONMENT OF A VEHICLE

CROSS-REFERENCE TO RELATED APPLICATION

This application claims priority to German Patent Application No. 10 2020 117 004.1, Jun. 29, 2020, the content of such application being incorporated by reference herein in its entirety.

FIELD OF THE INVENTION

The present invention relates to a method and a system for predicting a trajectory of a target vehicle in an environment of a vehicle.

BACKGROUND OF THE INVENTION

Modern motor vehicles often have driver assistance systems ("Advanced Driver Assistance Systems", ADAS), for example adaptive cruise control devices, collision warning systems, emergency braking assistants, highway assistants or congestion assistants, in order to reduce the risk of vehicle collisions and to increase driving comfort. Such driver assistance systems which zo operate in a partially autonomous or autonomous manner require a prediction of a trajectory of a target vehicle in the environment of the vehicle. Such a trajectory prediction is used, for example, as a basis for functional decisions, route planning or braking interventions. A predicted trajectory typically consists of a number N of predicted states of the target vehicle in two dimensions, for example the position, the speed, the yaw and the yaw rate of the target vehicle.

The methods known from the prior art for predicting a trajectory of a target vehicle in an environment of a vehicle use very different physical models or driving-maneuver-based models which must be adapted in a relatively complicated manner.

EP 3 467 799 A1, which is incorporated by reference herein, discloses a method for predicting a trajectory of a target vehicle in an environment of a vehicle, in which the type of vehicle moving along a lane of a road is captured and an item of movement prediction information is generated in order to predict a movement of the target vehicle on the basis of the type of target vehicle. In this case, the movement is assigned to the lane.

A challenge when predicting a trajectory of a target vehicle involves, inter alia, predicting the states of the target vehicle, in particular the position, the speed, the yaw and the yaw rate, for a period of up to five seconds in advance on the basis of the sensor signals or measurement data provided by a camera-based capture device. The method for predicting a trajectory of a target vehicle in an environment of a vehicle should also be as robust as possible in order to minimize the influence of outliers which are caused, for example, by random or systematic errors in the measured states, in particular in the positions and speeds of the target vehicle. On the basis of this, described herein is a further improved method and a system for predicting a trajectory of a target vehicle in an environment of a vehicle.

SUMMARY OF THE INVENTION

A method according to aspects of the invention for predicting a trajectory of a target vehicle in an environment of a vehicle comprises the steps of:

a) capturing states of the target vehicle, capturing states of further vehicle objects in the environment of the vehicle and capturing road markings by means of a camera-based capture device, b) preprocessing the data obtained in step a), wherein outliers are removed and missing states are calculated, c) calculating an estimated trajectory by means of a physical model on the basis of the data preprocessed in step b), d) calculating a driver-behavior-based trajectory on the basis of the data preprocessed in step b), e) combining the trajectories calculated in steps c) and d) to form a predicted trajectory of the target vehicle.

The method according to aspects of the invention makes it possible to predict the states of the target vehicle, in particular the position, the speed, the yaw and the yaw rate, preferably for a period of up to five seconds in advance on the basis of the data provided by the camera-based capture device. A robust method for predicting a trajectory of a target vehicle in an environment of a vehicle is also provided in order to minimize the influence of outliers which can be caused, for example, by random or systematic errors in the measured states, in particular in the positions and speeds of the target vehicle. In this case, the prediction of the trajectory of the target vehicle may advantageously take into account physical and environmental aspects of the respective driving situation and may weight them accordingly.

In one preferred embodiment, it is proposed that the trajectories calculated in steps c) and d) are optimized by means of an optimization algorithm before being combined. A simulated annealing algorithm may preferably be used as the optimization algorithm.

In one embodiment, it is possible to use a RANSAC filter algorithm to preprocess the data obtained in step a). This makes it possible to reliably capture and eliminate possible outliers in the measurement data.

A practical problem is often the fact that the camera sensors of the camera-based capture device is normally cannot provide a reliable estimation of the yaw and the yaw rate of the target vehicle. This is because the target positions of the target vehicle which are captured by means of the camera-based capture device are typically accompanied by both white, Gaussian noise and non-white, non-Gaussian noise. In one advantageous embodiment, it is therefore proposed that an alpha-beta filter algorithm is used to remove noise components from the data obtained in step a).

In one advantageous development, provision may be made for the course of the road and the course of the lane to be estimated when preprocessing the data obtained in step a) on the basis of measured states of the target vehicle and of further vehicle objects in the environment and of the vehicle itself and on the basis of the lane markings and static objects captured by the camera-based capture device.

In one embodiment, it is possible to use a modified CYRA model to calculate the estimated trajectory by means of the physical model in step c), in which model individual trajectories are calculated in a parallel manner by means of a plurality of physical models and a weighted trajectory is calculated by combining the individual trajectories. In this case, the modified CYRA model is based on the assumption of a constant yaw rate and a constant acceleration (CYRA="Constant Yaw Rate and Acceleration").

A system for carrying out the above described method comprises a camera-based capture device, which is designed to capture states of the target vehicle, to capture states of further vehicle objects in the environment of the vehicle and to capture road markings according to step a), and a computing device, in which at least means for carrying out steps b) to e) of the method are implemented.

In one embodiment, provision may be made for the computing device to comprise a prediction module in which a driver behavior classification module, in particular, is implemented, which has a Markov state machine in addition to a driving maneuver detection system. This makes it possible to improve the behavior classification. In this case, the behavior of the target vehicle is classified in a plurality of categories, for example "lane change", "keep in lane", "accelerate", "brake", "maintain speed", on the basis of a normalized lane assignment of the target vehicle, the derivative of the normalized lane assignment of the target vehicle and the speed vector. The input variables of the driver behavior classification module preferably form a number N of estimated historical states of the target vehicle, a number N of estimated historical states of the other vehicle objects and the estimated course of the road.

BRIEF DESCRIPTION OF THE DRAWING FIGURES

Figure 2:
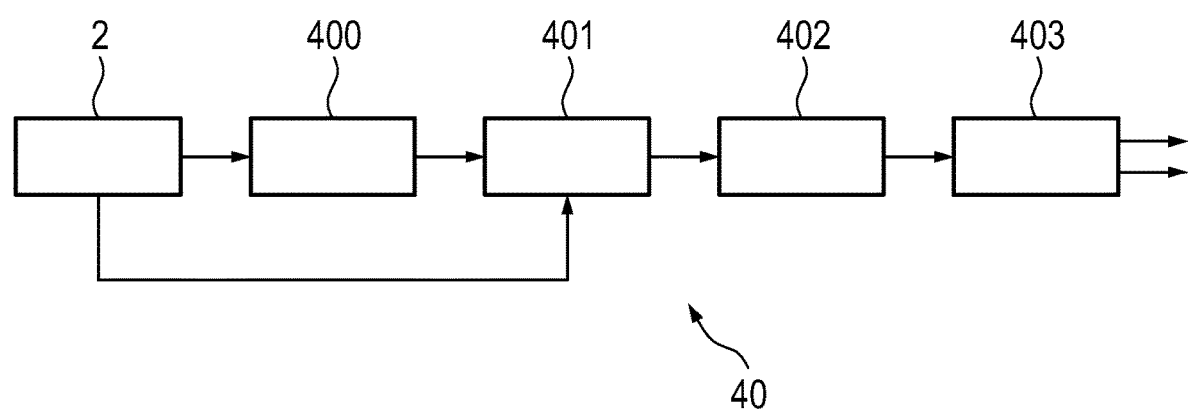
Figure 3:
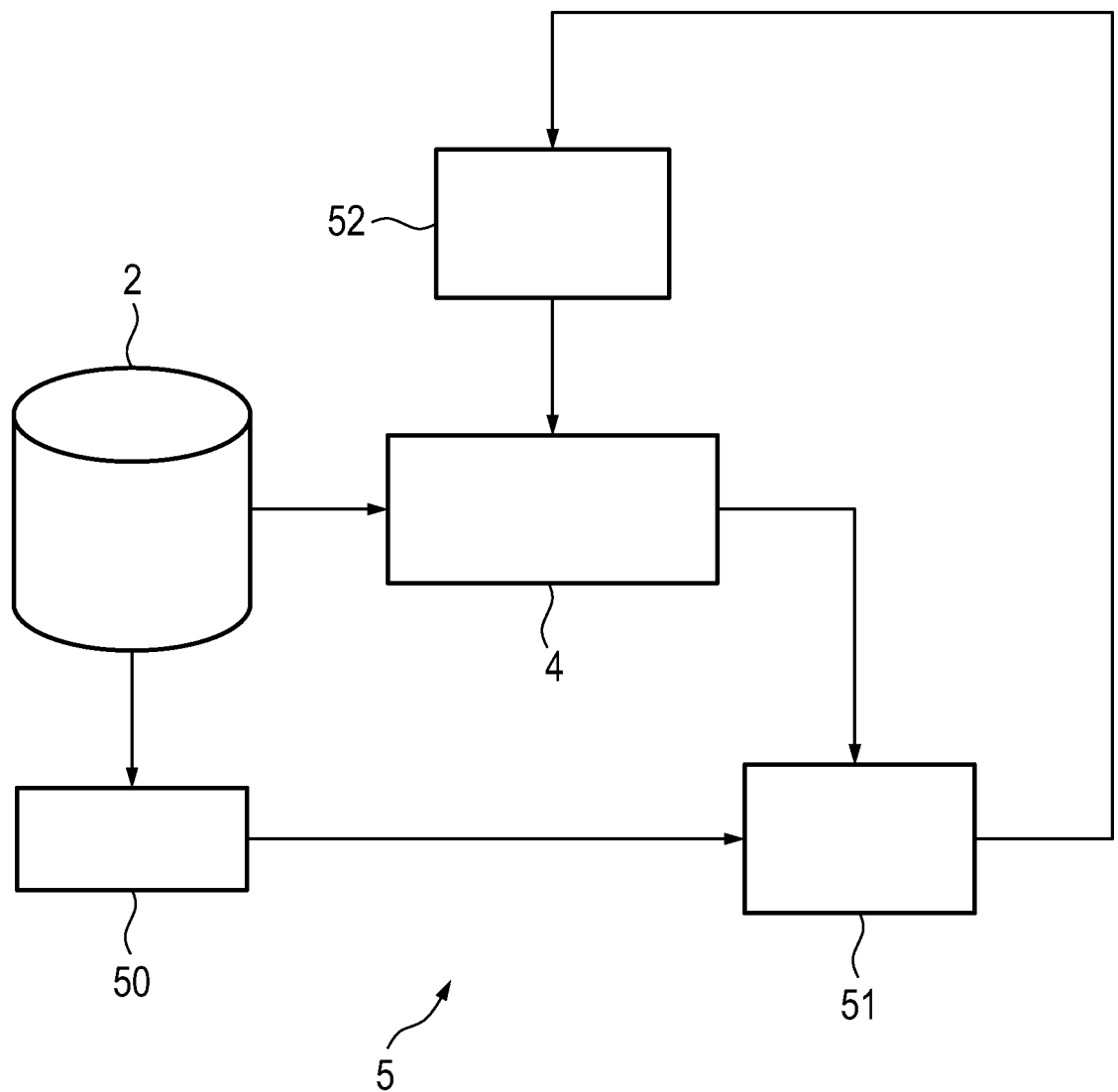

Further features and advantages of the present invention become clear on the basis of the following description of a preferred exemplary embodiment with reference to the accompanying figures, in which FIG. 1 shows a schematic illustration of a system which is designed to carry out a method for predicting a trajectory of a target vehicle in an environment of a vehicle according to one preferred exemplary embodiment of the present invention, FIG. 2 shows a schematic illustration which illustrates details of the preprocessing of the data captured by a camera-based capture device of the system, FIG. 3 shows a schematic illustration which shows details of an optimization algorithm.

DETAILED DESCRIPTION OF THE INVENTION

With reference to FIG. 1, a system 1 for carrying out a method for predicting a trajectory of a target vehicle in an environment of a vehicle comprises a camera-based capture device 2 which is designed, in particular, to capture and track the target vehicle and further vehicle objects in the environment of the vehicle and to detect lane markings.

The system 1 also comprises a computing device 3, in which a trajectory prediction module 4 is implemented, which module receives the measurement data from the camera-based capture device 2 as input variables and is designed to predict the trajectory of the target vehicle in the environment of the vehicle on the basis of these measurement data in the manner explained below by means of a computer-implemented method. For this purpose, a plurality of software modules 40, 41, 42, 43, 44, the functions of which shall be explained in more detail below, are implemented inside the trajectory prediction module 4.

The prediction module 4 has a preprocessing module 40 which is designed to preprocess the data which are captured by the camera-based capture device 2 and are made available to the prediction module 4 for further processing. The preprocessing module 40 is configured to remove is any outliers in the measured states of the target vehicle and of the further vehicle objects from the measurement data by means of an accordingly designed data preprocessing algorithm and to calculate missing states of the target vehicle and of the further vehicle objects.

In many situations, no lane markings, which can then be processed further, may be captured with the required reliability by the camera-based capture device 2 during the journey of the vehicle. Therefore, an algorithm is also implemented in the preprocessing module 40 and is designed to estimate the course of the road and the course of the lane on the basis of measured states of the target vehicle and of further vehicle objects in the environment and of the vehicle itself and on the basis of the lane markings and static objects, for example guardrails, gradients, etc., captured by the camera-based capture device 2.

A physical trajectory calculation module 41 is also implemented in the prediction module 4 and can calculate the trajectory of the target vehicle in the environment of the vehicle from the data provided by the preprocessing module 40 on the basis of a physical trajectory calculation model. In this case, a modified CYRA model is preferably used, in which model individual trajectories of the target vehicle are calculated in a parallel manner by means of a plurality of physical models and a weighted combination of these individual trajectories is calculated. In this case, the modified CYRA model is based on the assumption of a constant yaw rate and a constant acceleration ("Constant Yaw Rate and Acceleration", CYRA for short) of the target vehicle.

A driver behavior classification module 42 is also implemented in the prediction module 4 and, in addition to a driving maneuver detection system, has a Markov state machine in order to improve the behavior classification. In this case, the behavior of the target vehicle is classified in a plurality of categories, for example "lane change", "keep in lane", "accelerate", "brake", "maintain speed", on the basis of a normalized lane assignment of the target vehicle, the derivative of the normalized lane assignment of the target vehicle and the speed vector. Input variables of the driver behavior classification module 42 form a number N of estimated historical states of the target vehicle, a number N of estimated historical states of the other vehicle objects and the estimated course of the road.

A path planning module 43 is also implemented in the prediction module 4, which path planning module receives input data from the driver behavior classification module 42 and is designed to predict and output a behavior-based trajectory of the target vehicle. The path planning module 43 is configured to calculate a driver-behavior-based trajectory of the target vehicle on the basis of a is behavior category representing the driver behavior and on the basis of the target vehicle states and the target vehicle history.

A trajectory combining module 44 is also implemented in the prediction module 4. This trajectory combining module 44 is designed to combine the parameters of the trajectory, which is calculated by means of the physical trajectory calculation module 41, and the parameters of the trajectory, which is calculated by means of the path planning module 43, on the basis of an optimization algorithm. For this purpose, an optimization module 5 is implemented in the computing device 3 and is designed to jointly adapt all parameters of the trajectory of the target vehicle, which are obtained by means of the physical trajectory calculation module 41, the driver behavior classification module 42 and the path planning module 43, by means of appropriate optimization techniques.

With reference to FIG. 2, further details of the preprocessing of the data captured by the camera-based capture device 2 by means of the preprocessing module 40 shall be explained in more detail below. In this case, use is made of a novel method for estimating the yaw and the yaw rate of the target vehicle which is based on a number N (buffer 400) of previous target positions (x, y positions) of the target vehicle.

A substantial challenge is the fact that the camera sensors of the camera-based capture device 2 normally cannot provide a reliable estimation of the yaw and the yaw rate of the target vehicle. This is because the target positions of the target vehicle which are captured by means of the camera-based capture device 2 are accompanied by both white, Gaussian noise and non-white, non-Gaussian noise.

In the method used here, the target yaw and the target yaw rate are estimated by a yaw calculation module 402 on the basis of camera measurements, wherein outliers which are preferably captured by an adaptive RANSAC algorithm 401 are disregarded and noise influences are eliminated, preferably by means of an alpha-beta filter algorithm 403. In addition to the number N of previous target positions (x, y positions) of the target vehicle from the buffer 400, the speed of the target vehicle in the x direction is also included in the RANSAC algorithm 401.

The camera-based capture device 2 outputs the vehicle states of the target vehicle as positions in the x-y coordinate system of the vehicle, wherein the x axis represents the forward direction of travel of the vehicle. The novel algorithm for estimating the yaw and the yaw rate is based on a is modified RANSAC filter algorithm 401 and an alpha-beta filter 403. In this case, a number N of measurements of the target positions of the target vehicle is recorded. The positions of the target vehicle are fitted, with the aid of the RANSAC algorithm 401, with a line, the parameters of which are adapted online on the basis of the target position and the target speed. The angle between the fitted line and the x coordinate of the target vehicle can be calculated very easily and forms a measure of the yaw of the target vehicle. The yaw calculated in this manner is made available to an alpha-beta algorithm 403 which is designed to output filtered yaw and an estimated yaw rate.

With further reference to FIG. 3, further details of the optimization method which is carried out by means of the optimization module 5 shall be explained in more detail below.

Object data relating to the target vehicle and relating to further vehicle objects in the environment of the vehicle and detected road markings are recorded by means of the camera-based capture device 2. In this case, each target vehicle and each further vehicle object are provided as two-dimensional boxes with their corresponding covariance matrix by means of a camera interface of the camera-based capture device 2. Each captured road marking is provided as a clothoid parameter via the camera interface.

The optimization module 5 has a reference extraction module 50 which processes the data obtained in the manner described above from the camera-based capture device 2 as follows:

Recorded road markings (road lines), which were recorded as clothoids, are fitted with a cubic polynomial.

The road markings (road lines) are supplied to a novel algorithm for extracting the course of the road, by means of which an estimation of the course of the road is calculated.

Recorded positions of the target vehicle and of the further vehicle objects are processed by means of a smoothing function. The result of this smoothing is an estimation of the real trajectories of the target vehicle and of the further vehicle objects.

The basic truth behavior of the driver is characterized on the basis of the estimation of the course of the road and the trajectories of the target vehicle and the further vehicle objects.

These data are made available to an evaluation module 51. The prediction module 4 reads in the is data recorded by the camera-based capture device 2 and, after preprocessing these data, provides a prediction for a trajectory of a particular target vehicle. Errors in the x and y coordinates between the prediction and the estimated basic truth behavior of the driver are calculated by means of the evaluation module 51. The difference to the driver behavior classified by means of the driver behavior classification module 42 is compared with the characterized basic truth behavior of the driver.

An optimization algorithm 52 which is preferably based on a simulated annealing method calculates updated parameters for the prediction module 4 in order to minimize errors in the x and y directions and errors in the driver behavior classification module 42.

The algorithm for extracting the course of the road provides a novel way of extracting the estimation of the actual course of the road from camera recordings of the camera-based capture device 2 using imprecise measurements of road markings. This algorithm uses a window with recorded, imprecise and relatively short road markings (lines) and determines the actual position of the road marking therefrom using histogram estimations. In addition to the histogram estimation, the algorithm preferably also uses heuristics in order to detect merging and junction points of the road. The output of this algorithm is an estimated course of the road.

What is claimed is:

1. A method for predicting a trajectory of a target vehicle in an environment of a vehicle, said method comprising the steps of:
   a) capturing states of the target vehicle, capturing states of further vehicle objects in the environment of the vehicle, and capturing road markings using a camera-based capture device,
   b) preprocessing the data obtained in step a) by removing outliers and calculating missing states of the target vehicle and of the further vehicle objects,
   c) calculating an estimated trajectory using a physical model on the basis of the data preprocessed in step b),
   d) calculating a driver-behavior-based trajectory on the basis of the data preprocessed in step b),
   e) combining the trajectories calculated in steps c) and d) to form a predicted trajectory of the target vehicle, and
   f) using the predicted trajectory of the target vehicle as a basis for functional decisions, route planning or braking interventions in driver assistance systems, including Advanced Driver Assistance Systems (ADAS), adaptive cruise control, collision warning, emergency braking, highway assistants or congestion assistants,
      wherein the predicted trajectory of the target vehicle includes a predicted position, a predicted speed, a predicted yaw, and a predicted yaw rate for a period of time up to five seconds in advance, and
      wherein an actual position of the road markings is determined using histogram estimations and heuristics detecting merging and junction points of the road.

2. The method as claimed in claim 1, further comprising optimizing the trajectories calculated in steps c) and d) using an optimization algorithm before the trajectories calculated in steps c) and d) are combined.

3. The method as claimed in claim 2, further comprising using a simulated annealing algorithm as the optimization algorithm.

4. The method as claimed in claim 1, further comprising using a RANSAC filter algorithm to preprocess the data obtained in step a).

5. The method as claimed in claim 1, further comprising using an alpha-beta filter algorithm to remove noise components from the data obtained in step a).

6. The method as claimed in claim 1, further comprising estimating a course of the road and a course of the lane when preprocessing the data obtained in step a) on the basis of measured states of the target vehicle and of further vehicle objects in the environment and of the vehicle itself and on the basis of the lane markings and static objects captured by the camera-based capture device.

7. The method as claimed in claim 1, further comprising using a modified CYRA model to calculate the estimated trajectory using the physical model in step c), in which modified CYRA model (i) individual trajectories are calculated in a parallel manner using a plurality of physical models and (ii) a weighted combination of the individual trajectories is calculated.

8. The system as claimed in claim 1, further comprising classifying a behavior of the target vehicle in a plurality of categories including lane change, keep in lane, accelerate, brake, or maintain speed, based on a normalized lane assignment of the target vehicle, a derivative of the normalized lane assignment of the target vehicle and a speed vector.

9. The method as claimed in claim 1, wherein an actual position of the road markings is determined using histogram estimations.

10. The method as claimed in claim 1, wherein the preprocessing the data obtained in step a) is performed by estimating the yaw and the yaw rate of the target vehicle relative to a predetermined number of previous target positions of the target vehicle in a x-y coordinate system.

11. The method as claimed in claim 1, wherein the predicted trajectory of the target vehicle is based on a weighted combination of a plurality of physical models.

12. The method as claimed in claim 1, wherein the driver-behavior-based trajectory is based on a predetermined number of estimated historical states of the target vehicle, a predetermined number of estimated historical states of the further vehicle objects, and an estimated course of the road.

13. A system for predicting a trajectory of a target vehicle in an environment of a vehicle, said system comprising a camera-based capture device and a computing device, wherein the system is configured to predict a trajectory of a target vehicle in an environment of a vehicle by:
a) capturing states of the target vehicle, capturing states of further vehicle objects in the environment of the vehicle, and capturing road markings using the camera-based capture device,
b) preprocessing the data obtained in step a) using the computing device by removing outliers and calculating missing states of the target vehicle and of the further vehicle objects,
c) calculating an estimated trajectory using a physical model on the basis of the data preprocessed in step b),
d) calculating a driver-behavior-based trajectory on the basis of the data preprocessed in step b),
e) combining the trajectories calculated in steps c) and d) using the computing device to form a predicted trajectory of the target vehicle, and
f) using the predicted trajectory of the target vehicle as a basis for functional decisions, route planning or braking interventions in driver assistance systems, including Advanced Driver Assistance Systems (ADAS), adaptive cruise control, collision warning, emergency braking, highway assistants or congestion assistants,
wherein the captured states of the target vehicle include a position, a speed, a yaw and a yaw rate,
wherein the predicted trajectory of the target vehicle includes a predicted position, a predicted speed, a predicted yaw, and a predicted yaw rate for a period of time up to five seconds in advance, and
wherein an actual position of the road markings is determined using histogram estimations and heuristics detecting merging and junction points of the road.

14. The system as claimed in claim 13, wherein the computing device comprises a prediction module in which a driver behavior classification module is implemented, which has a Markov state machine in addition to a driving maneuver detection system.

15. A method for predicting a trajectory of a target vehicle in an environment of a vehicle, said method comprising the steps of:
a) capturing states of the target vehicle, capturing states of further vehicle objects in the environment of the vehicle, and capturing road markings using a camera-based capture device,
b) preprocessing the data obtained in step a) by removing outliers and calculating missing states of the target vehicle and of the further vehicle objects,
c) calculating an estimated trajectory using a physical model on the basis of the data preprocessed in step b),
d) calculating a driver-behavior-based trajectory on the basis of the data preprocessed in step b),
e) combining the trajectories calculated in steps c) and d) to form a predicted trajectory of the target vehicle, and
f) using the predicted trajectory of the target vehicle as a basis for functional decisions, route planning or braking interventions in driver assistance systems, including Advanced Driver Assistance Systems (ADAS), adaptive cruise control, collision warning, emergency braking, highway assistants or congestion assistants,
wherein the preprocessing the data obtained in step a) is performed by estimating the yaw and the yaw rate of the target vehicle relative to a predetermined number of previous target positions of the target vehicle in a x-y coordinate system, and
wherein the predicted trajectory of the target vehicle includes a predicted position, a predicted speed, a predicted yaw, and a predicted yaw rate for a period of time up to five seconds in advance, and
wherein the predicted yaw and the predicted yaw rate are estimated based on camera measurements by disregarding outliers captured by an adaptive RANSAC algorithm and eliminating noise influences by means of an alpha-beta filter algorithm.

16. The system as claimed in claim 15, wherein the speed of the target vehicle in an X direction is included in the adaptive RANSAC algorithm.

17. The method as claimed in claim 15, further comprising classifying a driver behavior of the target vehicle in a plurality of behavior categories including lane change, keep in lane, accelerate, brake, or maintain speed, based on a normalized lane assignment of the target vehicle, a derivative of the normalized lane assignment of the target vehicle, and a speed vector, and calculating the driver-behavior-based trajectory of the target vehicle based on a behavior category representing the driver behavior.

18. The system as claimed in claim 15, wherein positions of the target vehicle are fitted with the adaptive RANSAC algorithm with a fitted line, the parameters of which are adapted online on the basis of a target position and a target speed and wherein a calculated angle between the fitted line and an X coordinate of the target vehicle represents a measure of the predicted yaw of the target vehicle.

* * * * *